CONTINUOUSLY VARIABLE LASER-ACOUSTIC DELAY LINE

Filed March 4, 1968

INVENTORS
ANTHONY J. DeMARIA
MICHAEL J. BRIENZA
BY Donald F. Bradley
ATTORNEY

United States Patent Office 3,544,806

Patented Dec. 1, 1970

3,544,806
CONTINUOUSLY VARIABLE LASER-ACOUSTIC DELAY LINE

Anthony J. de Maria, West Hartford, and Michael J. Brienza, Vernon, Conn., assignors to United Aircraft Corporation, East Hartford, Conn., a corporation of Delaware Filed Mar. 4, 1968, Ser. No. 710,379
Int. Cl. H03h 7/30
U.S. Cl. 307—88.3 9 Claims

ABSTRACT OF THE DISCLOSURE

A laser beam is propagated through an acoustic cell, in which an electrical signal generates a high-frequency acoustic wave, and the laser beam intersects the acoustic wave at the Bragg angle. The laser beam is thereby Bragg diffracted, and the zero order and diffracted order beams are heterodyned at a photodetector to reproduce the electrical signal. A beam scanner is positioned before the acoustic cell to vary the position along the cell at which the laser beam intersects the acoustic wave and thereby vary the time delay between the generation and reproduction of the acoustic wave.

BACKGROUND OF THE INVENTION

This invention relates to delay lines in which an electrical input signal is delayed in time by optical-acoustic interaction. In prior art delay lines, an electrical input signal is fed to a transducer connected with an acoustic cell which produces an acoustic wave in the cell. The acoustic wave is intersected by a laser beam at the Bragg angle and the laser beam is diffracted into orders, one of which is frequency shifted by an amount equal to the acoustic frequency. The diffracted orders are heterodyned and fed to a photodetector to reproduce the electrical signal. The time delay is equivalent to the time between initiation of the acoustic wave in the cell and the time of the intersection of the acoustic wave by the laser beam. The time delay may be varied by mechanically translating the acoustic cell.

Delay lines as described above are well known in the art. For example, copending application, Ser. No. 364,395 entitled "Variable Laser-Ultrasonic Delay Line," filed May 4, 1964, now abandoned, by Anthony J. De Maria and assigned to the same assignee, discloses and claims the basic concepts of a variable delay line in which a birefringent quartz crystal produces the variable delay. Copending application Ser. No. 551,965 entitled "Variable Acoustic Laser Delay Line," filed May 23, 1966, now abandoned, by Anthony J. De Maria and assigned to the same assignee discloses numerous other delay line configurations. Copending application Ser. No. 642,829 entitled "Continuously Variable Laser Acoustic Delay Line," filed June 1, 1967, now Patent No. 3,463,573, by Michael J. Brienza and assigned to the same assignee, discloses and claims a delay line in which the delay may be continuously varied over a wide range.

The principal desirable feature of laser-acoustic delay lines is their ability to produce a continuously variable delay of a radio-frequency or microwave signal. The referenced prior art devices are of limited utility either because the method for producing the variable delay is by mechanically changing the distance between the acoustic transducer and the path of the laser beam, or because the non-mechanically scanned devices have small time delay ranges. Mechanical devices are impractical because they are slow, and many applications exist where such mechanical adjustment of the delay cannot be tolerated. The small time delay ranges are caused by the small angular width of Bragg-type optical-acoustic interaction, and the necessity for maintaining the proper conditions for optically heterodyning the diffracted laser beam orders.

SUMMARY OF THE INVENTION

The present invention overcomes the limitations of the prior art devices by providing a continuously variable laser-acoustic delay line including means to scan the laser beam before it intersects the acoustic cell to vary the time delay while still maintaining the angle of intersection between the laser beam and the acoustic wave at the Bragg angle to produce diffraction.

Another feature of this invention is a continuously variable laser-acoustic delay line including means for maintaining a fixed position for the optical detector while providing for optical heterodyning during the entire variable range of the scan.

A further feature of this invention is a continuously variable laser-acoustic delay line including the combination of a digital light beam translator and beam scanner for electronically controlling the time delays over large time intervals.

Another object of this invention is a continuously variable laser-acoustic delay line including scanning means for the laser beam in which self-heterodyning of the diffracted laser beam is utilized.

In accordance with one embodiment of this invention, a light beam scanner is utilized to deflect a laser beam, and a lens renders the deflected beam parallel to the original beam. The acoustic cell is positioned at the Bragg angle relative to the laser beam. The laser beam is diffracted into orders by the acoustic wave generated in the cell by an RF input signal, and a lens and spherical mirror arrangement cause the zero and diffracted orders to be optically heterodyned at a photodetector to reproduce the RF input signal delayed in time.

In accordance with another embodiment of this invention, the incoming light beam is passed through an electronically controlled polarization switch such as a Kerr cell, where the beam is polarized in one of two orthogonal polarization states. The polarized beam is then passed through a birefringent element where, depending on the beam polarization, one of two output directions is selected. Any number of polarization switches and birefringent element combinations may be staged in series to produce an overlapping array of parallel light beam positions where the particular position may be electronically selected. The selected beam is then passed through an acoustic cell in which is generated an acoustic wave, and the diffracted orders are optically heterodyned at a detector to reproduce the acoustic wave generating signal delayed in time.

The heterodyning of the signals may utilize known mirror arrangements, or a self-heterodyning technique.

DESCRIPTION OF THE PREFERRED EMBODIMENT

Figure 2:
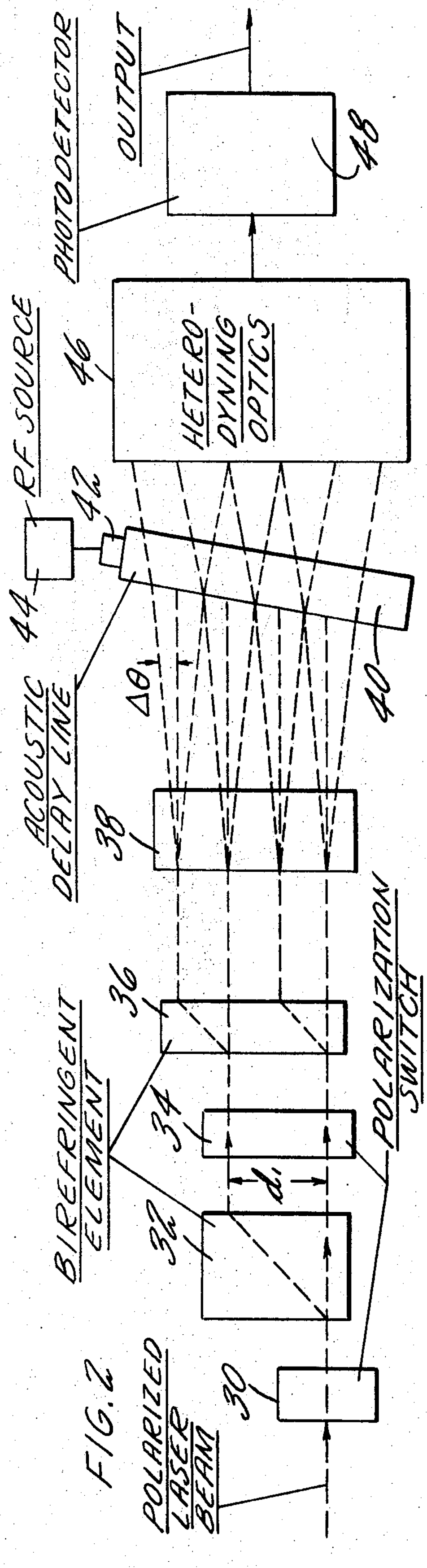
FIG. 2 is a schematic block diagram of a digital light beam deflector utilizing scanning of the beam for delay line operation.

Operation of laser-acoustic delay lines at high frequencies depends upon the Bragg type of acoustical-optical interaction as opposed to normal or Raman-Nath diffraction. In Bragg type diffraction, a light beam is diffracted appreciably by an acoustic wave only if the angle between the light beam and the acoustic wave is at the Bragg angle, that is, when the angle $\theta_B$ between the light beam and the normal to the acoustic wave is specified by $$\sin \theta_\beta = \frac{\lambda}{2\eta\Lambda} \quad \text{(Eq. 1)}$$

where $\lambda$ and $\Lambda$ are the optic and acoustic wavelengths respectively, and $\eta$ is the index of refraction of the acoustic medium. For typical materials at an acoustic frequency of 500 mHz., the Bragg angle $\theta$ is on the order of one-half to one-third degree.

For Bragg type diffraction only one diffracted order is produced, and the diffracted beam varies in intensity I with angular deviations $\Delta\theta$ from the Bragg angle $\theta_B$ by $$I = I \max \left[\frac{\sin \pi L \Delta\theta/\Lambda}{\pi L \Delta\theta/\Lambda}\right]^2$$

where L is the thickness of the acoustic field through which the light beam passes, $\Lambda$ is the acoustic wavelength, and I max is the maximum intensity of the diffraction order when at the Bragg angle and is given by $$I \max = \pi \Delta \eta L/\lambda$$

For an acoustic frequency of 500 mHz. and an acoustic field thickness of 0.1 in. in a quartz cell, intensity I is at a maximum at an angle of about 0° 40′, and falls to zero at 0° 20′ and 1° 0′, with the distance between the half power points being about 30′ of arc. The half-angular width ($\Delta\theta$ half) at the half intensity points ($I/I \max = \frac{1}{2}$) is given by $$\Delta\theta \text{ half} \simeq \frac{1.39\Lambda}{\pi L}$$

If $\Lambda = 10^{-3}$ cm. and $L = 2.5$ mm., $\Delta\theta$ half$\simeq$0.1 degree.

Bragg-type of diffraction takes place only when the condition $$\frac{\lambda}{\Lambda^2} \frac{L}{\eta} \geq 2$$

is satisfied.

A light beam diffracted in the direction of acoustic wave propagation experiences an increase in frequency, while a light beam which is diffracted in the opposite direction is lowered in frequency, the magnitude of the frequency change being equal to the frequency of the acoustic wave.

Before this invention the use of scanning cells to scan the laser beam and increase the range of delays available was not possible because of the limitations imposed by the scanning cells themselves. Continuously variable scanners produced only small angular deflections, and larger displacement optical beam deflection devices are discontinuous.

This invention overcomes the small angular deflection limitation of the prior art by cascading a plurality of digital light scanners with a scanning cell to produce an overlapping array of light beam positions.

The prior art devices are also limited by the necessity of mechanically adjusting the acoustic cell to vary the delay, by the small angular width imposed on Bragg-type acoustical-optical interaction, and by the critical mirror placement necessary to maintain optical heterodyning of the zero order and diffracted order beams.

This invention overcomes the mechanical limitations of the prior art devices by arranging a scanning cell and a series of lenses do provide a delay line continuously variable over a large range without the necessity of mechanical adjustment of the acoustic cell or the heterodyning mirrors.

Figure 1:
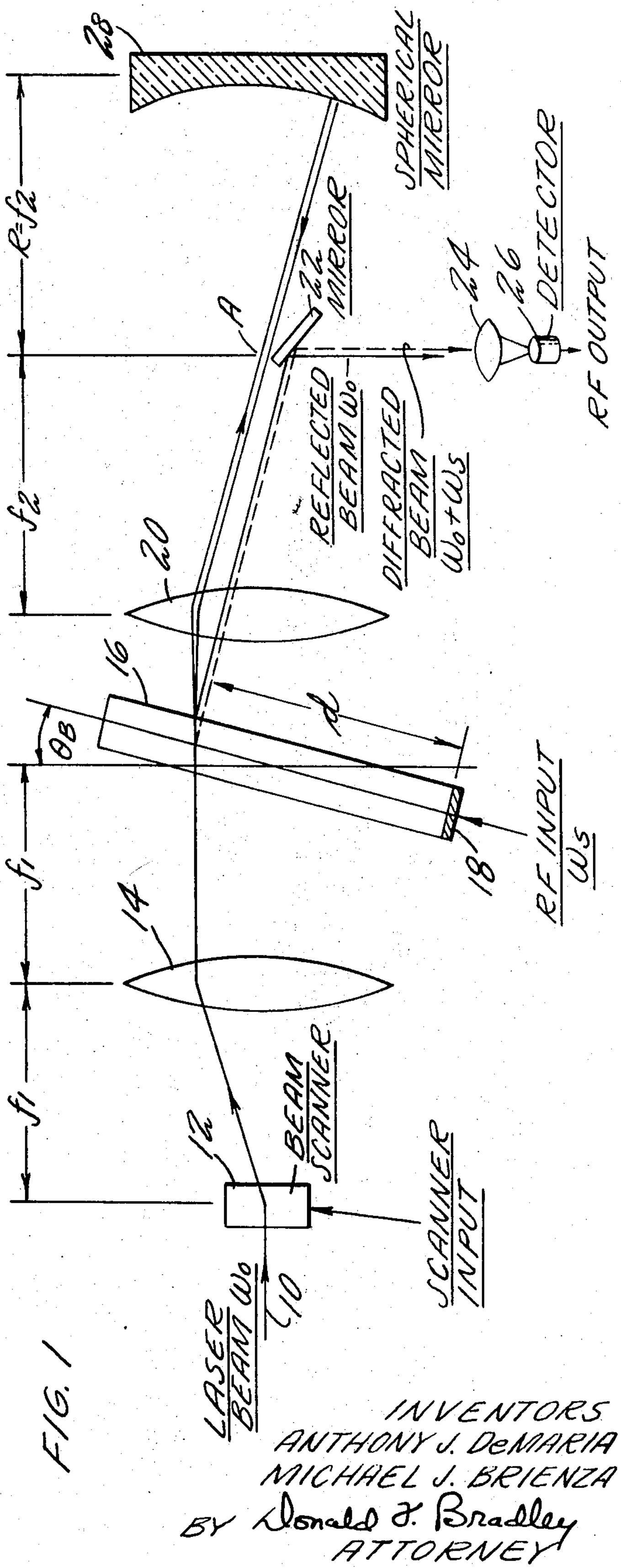
FIG. 1 is a schematic block diagram of a laser-acoustic delay line which is electrically variable for high frequency Bragg-type operation and in which the laser beam is scanned.

In FIG. 1 a laser beam 10 of frequency $\omega_0$ enters a beam scanner 12 which is placed at a distance $f_1$, the focal point, from a lens 14. The beam scanner may be an ultrasonic deflection cell as disclosed and claimed in copending application Ser. No. 407,082 entitled "Ultrasonic Scanning Cell" filed Oct. 28, 1964 by Herbert G. Aas and Robert K. Erf and assigned to the same assignee. The ultrasonic scanning cell produces non-mechanical deflection of a light beam by ultrasonically establishing a time varying refractive index gradient in a suitable medium. An ultrasonic standing wave is generated in the cell by an input electrical signal which actuates a transducer. Other types of beam scanners may also be used.

The deflected laser beam in FIG. 1 is rendered parallel to the path of the original laser beam by lens 14, the beam being displaced from the optic axis of lens 14 and the original laser beam path. Adjustment of the input signal to beam scanner 12 will determine the direction and amount of deflection of the laser beam.

An acoustic cell 16 such as a quartz crystal having a transducer 18 attached at one end thereto is positioned at the Bragg angle $\theta_B$ with respect to the optic axis of lens 14 and the original laser beam path. An electrical input signal of RF frequency $\omega_5$ is fed to actuate transducer 18 and generate a high frequency traveling acoustic wave in cell 16. The acoustic wave intersects the laser beam after a time delay equal to the distance $d$ between the transducer 18 and the point of intersection divided by the velocity of the acoustic wave in cell 16.

The distance from lens 14 to acoustic cell 16 can also be made equal to $f_1$ if it is desired to have the laser beam focused as it intersects the acoustic wave.

The laser beam is diffracted upon intersecting the acoustic wave. The undiffracted portion of the beam is focused by lens 20 to point A at the focal distance $f_2$ from lens 20. The diffracted portion of the beam, which is also frequency shifted by an amount equal to $\omega_5$, is focused by lens 20 onto mirror 22, where it is reflected through a lens 24 onto a photodetector 26.

The undiffracted beam portion proceeds from point A to a spherical mirror 28 having a radius of curvature R equal to the focal length $f_2$ of lens 20, and having its center of curvature at point A. Mirror 28 causes the undiffracted beam to fold back on itself and retrace its original path through point A and lens 20 to cell 16 where a portion of the beam is again reflected from the surface of cell 16 and redirected along the path of the diffracted beam portion. The reflected beam intersects mirror 22 and is further reflected onto photodetector 26 through lens 24. Thus both the diffracted and the undiffracted beams are directed onto the photodetector 26 where they are optically heterodyned to recover the original RF input signal $\omega_5$.

The geometry of the above described delay line is such that the diffracted and undiffracted beams will trace the same paths for all beam scanner angles within the field of view of lenses 14 and 20.

The heterodyning technique where the undiffracted beam is reflected from the acoustic cell crystal in the direction of the diffracted beam is more fully described in an article in Applied Physics Letters, 9, 312 (1966).

Another method for producing long continuously electrically variable time delays with laser acoustic delay lines while maintaining the critical requirement that the laser beam intersect the acoustic wave at the Bragg angle is to utilize very small scanning angles, for example the thirty minutes of arc between the half power points at a frequency of 500 mHz., and to greatly increase the distance between the optical scanner and the acoustic cell. Small angles can easily be obtained with presently available nonmechanical light beam deflectors. Since the time delay of the delay line is determined by the distance $d$, a large variation in the distance $d$ can be produced with a small light beam angular deflection, $\Delta\theta$, if the distance between the acoustic cell and the optical scanner is made very large as seen from the relation $d = (\tan \Delta\theta)L$.

One method of increasing the path length without physically increasing the size of the apparatus is to utilize a folded optical path. It has been shown that 3000 meter optical path lengths can be obtained by reflecting a light beam between two spherical mirrors. The converging power of the spherical mirrors markedly reduces diffraction losses in the light beam. With such a folded optical path using mirrors having reflectivities of 99.9%, the optical attenuations will be approximately 0.6 decible per microsecond of optical delay.

In copending application Ser. No. 672,924 entitled "Laser-Acoustic Signal Processor" filed Oct. 4, 1967 by Michael J. Brienza, there is described a technique for self-heterodyning. Specifically, a telescope or lens is placed on the laser to apply a small convergence angle to the laser beam to thereby focus the light beam on the acoustic cell. If the convergence angle is made slightly larger than the diffraction angles, the diverging diffracted and undiffracted beams emerging from the acoustic cell will then substantially overlap and heterodyne to reproduce the Doppler frequency shift. This heterodyning technique is most useful for low frequencies where the diffraction angle is small, that is frequencies slightly below approximately 150 megacycles which is the lower limit for Bragg angle diffraction. In FIG. 1, lens 14 can produce the necessary convergence of the laser beam, and the self-heterodyning technique may be utilized merely by positioning detector 26 at point A.

A combination of a digital light beam translator and a beam scanner may be used with a laser acoustic delay line for electronically controlled delays which are continuously variable over large time intervals. A typical block diagram of a digital plus scanning light beam deflector for obtaining a large continuously electrical variable time delay is shown in FIG. 2.

An incoming laser beam which has a convergence angle applied thereto as described above and which is polarized passes through an electrically controlled polarization switch 30 which can consist of either a Kerr cell or a Pockel cell. The switch may be actuated to pass only one of the two orthogonal polarization states, i.e., horizontal or vertical polarization.

Depending upon the polarization of the light beam after leaving switch 30, the light beam passes through a birefringent element 32 such as quartz, leaving the birefringent element in one of two possible output positions separated by a distance $d_1$. Thus the output position or direction is selectable by applying one of two different voltages to the polarization switch 30 to select either of the two orthogonal polarization states.

Any number of binary deflection stages may be arranged in series to provide more than two output positions for the light beam. FIG. 2 illustrates two stages. The second stage consists of a second polarization switch 34 and a second birefringent element 36. Thus as the light beam leaves element 32, polarization switch 34 may also be selectively actuated to provide the light beam with one of two orthogonal polarization states, and depending upon the state selected the beam will pass through birefringent element 36 as either a normal ordinary wave or an extraordinary wave.

The lateral displacements increase as the geometric progression 1, 2, 4, 8 . . . $2^{n-1}$, and the lateral displacement $d_n$ between two adjacent light beams passing through $n$ cascaded binary stages is given by $$d_n = \frac{d_1}{2^{m-1}}$$

The beam can thus be directed to any one of $2^n$ positions. As many binary stages as required may be used to reduce the distance $d_n$ to a small enough value so that an optical scanner 38 having a deflection angle $\Delta\theta$ can scan over the length of $d_n/2$ at a distance L from the scanner. For a small $\Delta\theta$, the relationship between the parameters is given by $$\Delta\theta \simeq \frac{d_1}{2^n L}$$

In other words, enough binary stages may be cascaded so that a scanner can provide a small scanning angle to any incoming light beam to provide a continuously variable position for the light beam as it intersects acoustic cell 40. Bragg angle diffraction may also be utilized for this technique.

This method also yields the possibility of producing a multiple tapped delay line, and the number and position of the taps can be changed with electronic device speed and accuracy.

As in FIG. 1, the acoustic cell 40 is actuated by a transducer 42 from a radio frequency source 44 to generate an acoustic wave within the cell. The cell is positioned in the path of the incoming laser beam. As the selected optical beam passes through the acoustic cell and is diffracted thereby, the diffracted and undiffracted orders are heterodyned as shown in block 46, and the heterodyned signal passes to photodetector 48 where an output signal equivalent to the radio frequency source signal through a time delay is reproduced.

For high acoustic frequencies, Bragg angle diffraction will take place, and the acoustic cell will be positioned at the Bragg angle relative to the incoming laser beam. For lower acoustic frequencies, normal diffraction will take place and it is not necessary to position the cell at the Bragg angle. In both cases enough binary stages must be cascaded to provide a continuous scan along the acoustic cell, i.e., the number and separation of the beam positions must be sufficient to produce a continuous scan, taking into account the small angular range within which Bragg diffraction will take place, at the small deflection range of most scanners.

Heterodyning optics 46 may be any type of heterodyning technique including that shown in FIG. 1, and for low frequencies may include the self-heterodyning described previously.

The birefringent elements 32 and 36 may be a crystal such as $NaNO_3$, $CaCO_3$ or KDP, a total internal reflection arrangement, or a Wollaston prism. The amount of displacement obtained in a birefringent crystal may easily be calculated and depends upon the ordinary and extraordinary indices of refraction of the birefringent crystals and the orientation of the optics axis of the crystal.

Eight binary stages will allow the positioning of a laser beam to any one of 256 positions. By controlling the polarization switches so that both orthogonal polarizations of the light beam exist upon entering the birefringent elements, a tapped delay line with 256 taps can be obtained. It should be recognized, however, that for the tapped delay line the intensity of each of the 256 light beams will be $1/256$ of the incoming light beam.

Although this invention has been shown and described with respect to the preferred embodiment thereof, it should be understood by those skilled in the art that the foregoing and various other changes and omissions in the form and detail thereof may be made without departing from the scope of the invention, which is to be limited and defined only as set forth in the following claims.

Having thus described a preferred embodiment of my invention what I claim as new and desire to secure by Letters Patent of the United States is:

1. Apparatus for producing a variable delay of an input signal comprising
an acoustic cell,
means responsive to an input signal for generating an acoustic wave which propagates in said cell,
a polarized light beam,
a polarization switch positioned in the path of said light beam,
means for actuating said switch to cause said switch to pass only one orthogonal polarization component of said light beam,
a birefringent element for deflecting said light beam polarization component along one of two distance separated output paths as a function of the polarization at said light beam, each of said output paths intersecting said acoustic wave, said light beam being diffracted thereby and producing a zero order beam and at least one frequency shifted diffracted order beam, and means for selectively heterodyning said zero order and diffracted order beams.

2. Apparatus as in claim 1 and including a second polarization switch and a second birefringent element positioned in the path of said light beam to produce a plurality of distance separated output paths for said light beam.

3. Apparatus as in claim 1 in which said polarization switch is a Kerr cell actuated by an external electrical signal.

4. Apparatus as in claim 1 in which said polarization switch is a Pockels cell.

5. Apparatus as in claim 1 and including scanning means positioned in the output path from said birefringent element for varying the position at which said light beam intersects said acoustic cell.

6. Apparatus as in claim 5 in which said light beam intersects said acoustic cell at the Bragg angle.

7. Apparatus as in claim 5 and including a first lens positioned between said scanning means and said cell for focusing said light beam at said acoustic cell, said scanning means being positioned at the focal distance of said first lens from said lens.

8. Apparatus as in claim 7 in which said heterodyning means includes a second lens for focusing said zero order and diffracted order beams at a point, and an optical detector positioned at said point and responsive to said zero order and diffracted order beams.

9. Apparatus as in claim 7 in which said heterodyning means comprises a second lens positioned adjacent said acoustic cell, a spherical mirror having its center of curvature at the focal point of said second lens, and a photodetector, said zero order beam passing through said second lens to said spherical mirror and being reflected thereby along its original path to said acoustic cell, a portion of the reflected beam being again reflected from said cell to said photodetector, said diffracted order beam passing through said second lens and being reflected to said photodetector, said photodetector means producing an output signal equal to the beat frequency between said zero order and said frequency shifted diffracted order beams.

References Cited

UNITED STATES PATENTS 3,462,603 8/1969 Gordon ............ 307—88.3

OTHER REFERENCES

Brienza: "Applied Physics Letters," Mar. 1, 1968, pp. 181–184.

ROY LAKE, Primary Examiner

D. R. HOSTETTER, Assistant Examiner

U.S. Cl X.R.

333—30; 350—161